US012597577B2

(12) United States Patent
Hörlle et al.

(10) Patent No.: US 12,597,577 B2
(45) Date of Patent: Apr. 7, 2026

(54) FOOT SWITCH DEVICE AND MEDICAL DEVICE SYSTEM

(71) Applicant: OLYMPUS WINTER & IBE GMBH, Hamburg (DE)

(72) Inventors: Andreas Hörlle, Berlin (DE); Antonios Patelis, Berlin (DE)

(73) Assignee: OLYMPUS WINTER & IBE GMBH, Hamburg (DE)

( * ) Notice: Subject to any disclaimer, the term of this patent is extended or adjusted under 35 U.S.C. 154(b) by 202 days.

(21) Appl. No.: 18/412,060

(22) Filed: Jan. 12, 2024

(65) Prior Publication Data

US 2024/0242908 A1 Jul. 18, 2024

Related U.S. Application Data

(60) Provisional application No. 63/439,725, filed on Jan. 18, 2023.

(51) Int. Cl.

| | |
|---|---|
| ***H01H 47/32*** | (2006.01) |
| ***H01H 50/02*** | (2006.01) |
| ***H01H 50/36*** | (2006.01) |
| ***H01H 50/44*** | (2006.01) |

(52) U.S. Cl.
CPC ............ *H01H 50/36* (2013.01); *H01H 50/02* (2013.01); *H01H 50/44* (2013.01)

(58) Field of Classification Search
None
See application file for complete search history.

(56) References Cited

U.S. PATENT DOCUMENTS 5,755,200 A * 5/1998 Henderson ................ F02D 9/02
123/367

FOREIGN PATENT DOCUMENTS

| | | |
|---|---|---|
| DE | 20 2004 004 457 U1 | 7/2005 |
| DE | 10 2006 020 602 A1 | 11/2007 |
| DE | 10 2010 028 618 A1 | 11/2011 |
| DE | 20 2017 000 542 U1 | 3/2017 |

OTHER PUBLICATIONS

Oct. 13, 2023 Search Report issued in German Patent Application No. 10 2023 101 258.4.

* cited by examiner

*Primary Examiner* — Stephen W Jackson
(74) *Attorney, Agent, or Firm* — OLIFF PLC

(57) ABSTRACT

A foot switch device, includes: a housing; a pedal, the pedal being moveably attached to the housing; and a switching circuit; the switching circuit being configured to detect movement of the pedal relative to the housing, and to issue a switching signal when such movement is detected; wherein the switching circuit includes a coil arranged in the housing and a yoke attached to the pedal, so that movement of the pedal moves the yoke into or out of the coil. Also, a medical device system with a foot switch device.

11 Claims, 1 Drawing Sheet

FOOT SWITCH DEVICE AND MEDICAL DEVICE SYSTEM

FIELD

The present disclosure relates to control devices for medical systems. More particularly, the present disclosure relates to foot switches for medical device systems.

BACKGROUND

Foot switch devices are widely used in modern medicine for controlling medical devices like suction or irrigation pumps, imaging devices, and electrosurgical generators. They comprise a housing and a number of pedals movably attached to the housing, so that pedals can be selectively operated with a foot of a user. Operating the pedals causes activation or deactivation of switches associated with the pedals, and output signals of the switches are communicated to the medical device to be controlled.

Foot switch devices are popular because they offer hands-free controlling of medical devices. For making full use of the capabilities of foot switch devices, such devices are usually placed directly next to or underneath a patient under treatment. Foot switch devices are therefore placed in the sterile area, so that they need to be carefully cleaned and sterilized before each use.

For avoiding ingress of dirt and liquids during use of foot switch devices, such devices usually comprise completely sealed housings. However, known foot switch devices require openings for the wiring of the switches, which are placed outside of the housing so they can be activated or deactivated by the pedals. Further openings in the housing may be required for routing connection cables used for connecting the foot switch device to the medical device to be controlled.

While openings in the housing may be effectively sealed, such seals may be damaged by chemicals used for cleaning and sterilization. Therefore, they need to be replaced after a certain number of uses, which is undesirable. Further, insulating jackets of electrical wiring may also be damaged by chemicals, and therefore need to be replaced from time to time.

SUMMARY OF THE DISCLOSURE

The present disclosure provides a foot switch device comprising: a housing; a pedal, the pedal being movably attached to the housing; and a switching circuit; the switching circuit being configured to detect movement of the pedal relative to the housing, and to issue a switching signal when such movement is detected; wherein the switching circuit comprises a coil arranged in the housing and a yoke attached to the pedal, so that movement of the pedal moves the yoke into or out of the coil. Using the yoke and the coil, the switching circuit does not require wiring to be routed through a wall of housing.

The switching circuit may be configured to determine the inductance of the coil and to issue the switching signal based on the inductance. The switching circuit may further be configured to apply and alternating electrical input signal to the coil, receive an alternating electrical input signal from the coil, and determine the inductance of the coil based on the alternating electrical signal. The alternating electrical signal may be a square wave signal.

In some embodiments, the housing of the foot switch device may have a through-opening extending from an upper side of the housing to a lower side of the housing. The housing may be closed against the through-opening. For example, a wall of the housing may extend from the upper side of the housing along the through-opening to the lower side of the housing.

In some embodiments, the coil may be arranged in the housing to surround the through-opening. The yoke may further be configured to move into or out of the through-opening when the pedal is moved.

In some embodiments the housing of the foot switch device may comprise an upper housing portion and a lower housing portion, wherein the lower housing portion does not laterally extend beyond the upper housing portion.

In some embodiments, the foot switch device may be a wireless foot switch device.

The present disclosure further provides a medical device system, comprising: a medical device; and the foot switch device as described above; wherein the medical device is configured to be controlled through the foot switch device. The medical device may be an electrosurgical generator.

BRIEF DESCRIPTION OF THE DRAWINGS

The subject of this disclosure is further described in more detail at hand of some exemplary embodiments and drawings. Such embodiments and drawings are only provided for better understanding the concept of the disclosure, without limiting the scope of protection, which is defined by the appended claims.

The drawings show.

DETAILED DESCRIPTION

Figure 1:
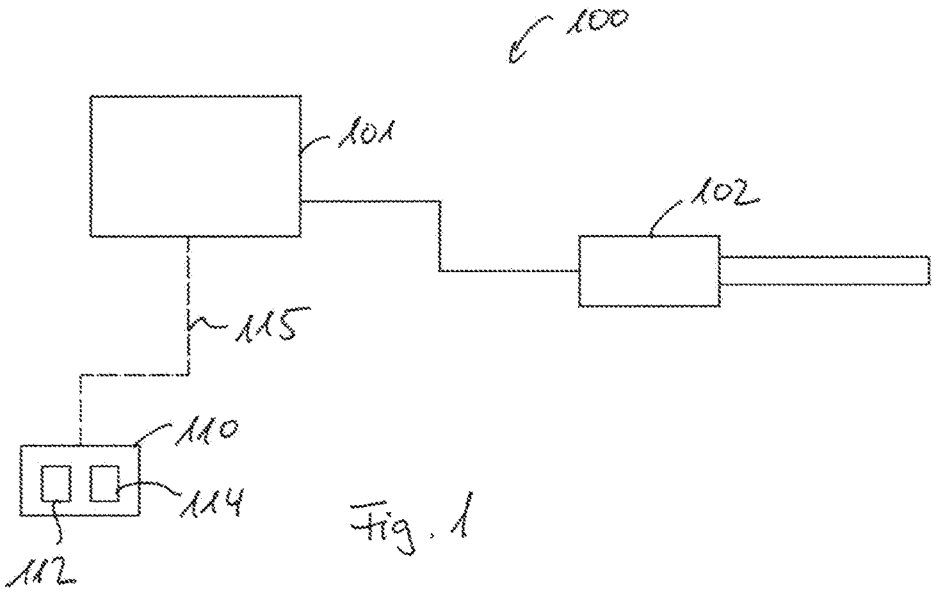
FIG. 1: A medical device system according to the present disclosure.

FIG. 1 shows a medical device system 100. Medical device system 100 comprises a medical device 101, which may be an electrosurgical generator. The medical device 101 is connected to a surgical instrument 102, which may be an electrosurgical instrument.

The medical device system 100 further comprises a foot switch device 110, which can be used by a practitioner to control the function of the medical device 101. In the shown example, the foot switch device 110 comprises two pedals 112, 114, which may be used to control the electrosurgical generator 101 to issue different electrosurgical therapy signals to the electrosurgical instrument 102. For example, when a practitioner pushes the left pedal 112, the electrosurgical generator 101 may be controlled to issue a coagulation signal to the electrosurgical instrument 102, and when a practitioner pushes the right pedal 114, the electrosurgical generator 101 may be controlled to issue a cutting signal to the electrosurgical instrument 102.

The foot switch device 110 may communicate with the electrosurgical device 101 through a wireless connection indicated by dashed line 115. Of course, the foot switch device 110 may also be connected to the medical device 101 using a wired connection.

In a usual setup, foot switch device 110 will be placed close to a patient under treatment, so that a practitioner can easily operate the pedals 112, 114 while performing a surgical procedure using the medical device 101 and the surgical instrument 102. Consequently, the foot switch device 110 is located in a sterile field and needs to be carefully cleaned and sterilized after each use.

Known foot switch devices usually comprise a sealed housing holding necessary electric and electronic components, while one or more pedals of the device are mounted outside of the housing so that they can be operated by a practitioner's foot. Electrical switches like micro switches are placed on the housing near the pedals to translate movement of the pedals into electrical signals. Signal lines of the switches need to be routed through the housing so the electrical signals can be processed by the components inside of the housing.

However, chemicals used for sterilizing of foot switch devices may damage the switches and signal lines, so that the foot switch device has a limited lifetime.

Figure 2:
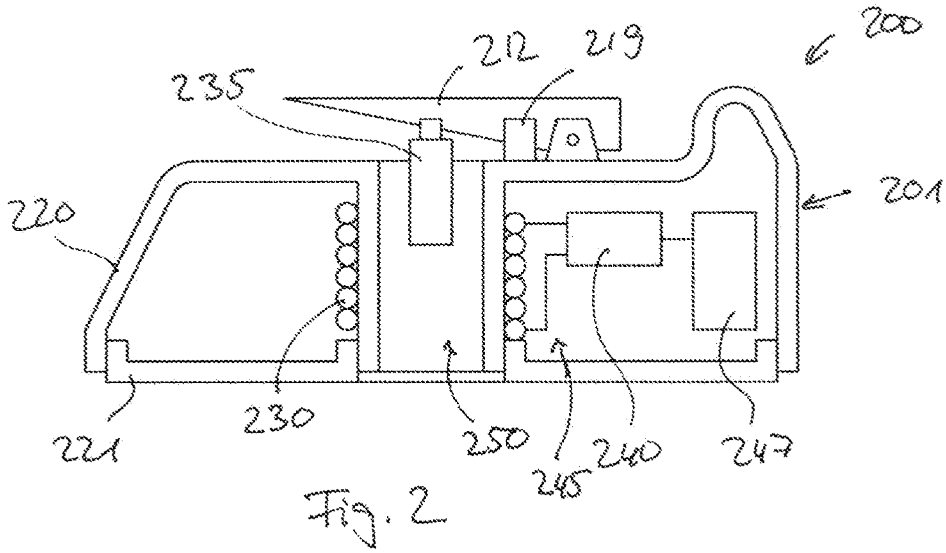
FIG. 2: a sectional view of a foot switch device according to the present disclosure.

FIG. 2 shows a sectional of an improved foot switch device 200 according to the present disclosure. The foot switch device 200 comprises a housing 201 and two pedals 212, 214, of which only one pedal 212 is visible in FIG. 2. The housing 201 consists of an upper housing portion 220 and a lower housing portion 221. The pedals 212, 214 (only pedal 212 is visible in FIG. 2) are mounted on top of the upper housing portion 220, similar to known foot switch devices. A spring element 219 under the pedal 212 biases the pedal 212 into an upper position, so that the pedal 212 can be pushed down by a practitioner's foot against the force of the spring element 219.

The foot switch device 200 does not comprise any switches or wiring outside of the housing 201. Instead, movement of the pedal 212 is detected by inductive coupling. Therefore, a coil 230 is provided in the housing 201, and interacts with a yoke 235 attached to the pedal 212. By moving they pedal 212 up or down, the yoke 235 moves out of or into the coil 230, changing the inductance thereof. The yoke 235 may for example contain ferrite.

The coil 230 is connected to a circuit 240 for measuring the inductance of the coil 230. The coil 230 and the circuit 240 form a switching circuit 245. The circuit 240 is configured to apply an alternating electrical input signal to the coil 230, and to receive an alternating electrical output signal from the coil 230. For example, the circuit 240 may comprise a multivibrator for creating a square wave current signal, and a voltage sensor for measuring the voltage drop over the coil 230. The circuit 240 may further comprise circuitry for analysing changes in the voltage drop to detect movement of the yoke 235 out of or into the coil 230.

In some embodiments, the switching circuit 245 may be configured to issue a binary switching signal indicating whether the yoke 235 has been moved beyond a predetermined switching point. In such embodiments, the foot switch device 200 can be used to send on/off commands to a medical device. In other embodiments, the switching circuit 245 may be configured to issue a continuous switching signal indicating how far the yoke 235 has been moved into the coil 230. In such embodiments, the foot switch device can be used for proportionally controlling parameters of a medical device.

Foot switch device 200 further comprises a communication unit 247 for communicating with a medical device to be controlled by the foot switch device 200. in the shown example, the communication unit 247 is a wireless communication unit. The wireless communication unit 247 may be configured to communicate with the medical device 101 using standardized wireless communication protocols like IEEE 802.11 (Wi-Fi), Bluetooth, or the like. In some embodiments, the communication unit 247 may be a wired communication unit (not shown in the drawings). the wired communication unit may be configured to communicate with the medical device 101 using standardized wired communication protocols like RS-232, ethernet, or the like.

As can be seen in FIG. 2, the housing 201 of the foot switch device 200 comprises a through-opening 250 for receiving the yoke 235. The wall of the upper housing portion 220 of the housing 201 extends along the through-opening 250 from an upper side of the housing 201 to a lower side of the housing 201, so that the housing 201 is closed against the through-opening 250. The coil 230 is placed in the housing 201 to surround the through-opening 250, so that the yoke 235 moves into and out of the coil 230 when the yoke 235 is moved along the through-opening 250.

The lower housing portion 221 of the housing 201 closes the housing 201 at the lower side thereof. The upper housing portion 220 and the lower housing portion 221 of the housing 201 define a sealed space, in which the coil 230, the circuit 245, and the communication unit 247 are located. The lower housing portion 221 is formed so that it does not laterally extend beyond the upper housing portion 220.

The housing 201 of the foot switch device 200 is shaped so that it does not contain any cavities, blind holes, or other shapes where liquids could accumulate and be difficult to remove from. Any fluids hitting the foot switch device 200 during use thereof will hit the upper housing portion 220, and will flow off the housing 201 without the risk of any fluid resting at or near the interface between the upper housing portion 220 and the lower housing portion 221. Further, any fluid reaching the through opening 250 can also flow towards the lower end of the housing 201 and then off the housing 201, without resting at or near the interface between the upper housing portion 220 and the lower housing portion 221. The through opening 250 is preferably sized so that it can easily be assessed with a brush or other cleaning device after the pedal 212 and the yoke 235 have been removed for cleaning.

The foot switch device 200 according to the present disclosure is therefore particularly easy to clean and sterilize, as all liquids used for cleaning and sterilizing the foot switch device 200 can also easily flow off the housing 201. at the same time, there are no electric or electronic switches or conductors outside of the housing 201, which could be damaged by aggressive chemicals used for cleaning and sterilizing the foot switch device 200.

The material of the housing 201 is preferably selected to provide sufficient structural stability to the foot switch device 200, to provide sufficient resistance against chemicals used for cleaning and sterilizing the foot switch device, and to allow electromagnetic interaction between the coil 230 and the yoke 235. Suitable materials may include, but are not limited to, thermoplastics, aluminium, aluminium alloys, or non-magnetic steel. The housing 201, particularly the upper housing portion 220, may be formed by cupping, deep drawing, aluminium dicasting, polymer injection molding, or the like.

Figure 3:
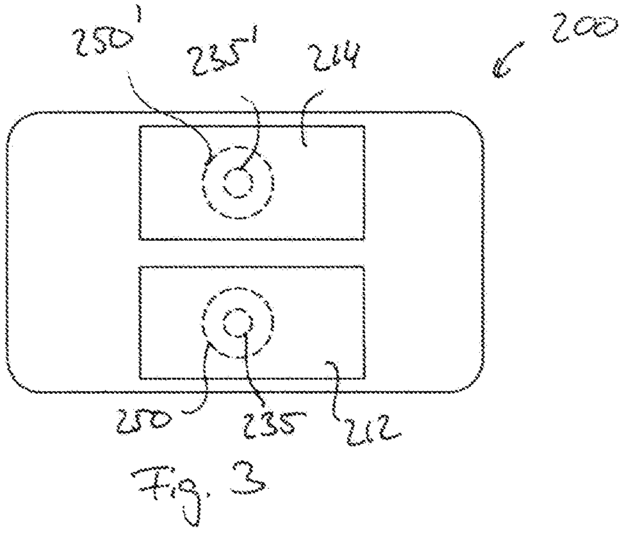
FIG. 3: a top view of the foot switch device of FIG. 2.

FIG. 3 shows a top view of the foot switch device 200 in which both pedals 212 and 214 are visible. The position of the through-opening 250 and the yoke 235 are indicated by dashed lines. A further through-opening 250' and a further yoke 235', which are associated with the second pedal 214, are also indicated by dashed lines.

It will be understood that the foot switch device 200 may also comprise a second switching circuit (not shown) associated with the second pedal 214. The second switching circuit may comprise a second coil and a second circuit, which may be identical with the switching circuit 245.

The invention claimed is:

1. A foot switch device, comprising:

a housing;

a pedal, the pedal being moveably attached to the housing; and a switching circuit, wherein:

the switching circuit being configured to detect movement of the pedal relative to the housing, and to issue a switching signal when such movement is detected;

the switching circuit comprises a coil arranged in the housing and a yoke attached to the pedal, so that movement of the pedal moves the yoke into or out of the coil; and the housing has a through-opening extending from an upper side of the housing to a lower side of the housing.

2. The foot switch device of claim 1, wherein the switching circuit is configured to determine an inductance of the coil, and to issue the switching signal based on the inductance.

3. The foot switch device of claim 2, wherein the switching circuit is configured to:

apply an alternating electrical input signal to the coil;

receive an alternating electrical output signal from the coil; and determine the inductance of the coil based on the alternating electrical output signal.

4. The foot switch device of claim 3, wherein the alternating electrical input signal is a square wave signal.

5. The foot switch device of claim 1, wherein the housing is closed against the through-opening.

6. The foot switch device of claim 5, wherein the coil is arranged in the housing to surround the through-opening.

7. The foot switch device of claim 6, wherein the yoke is configured to move into or out of the through-opening.

8. The foot switch device of claim 1, wherein:

the housing comprises an upper housing portion and a lower housing portion; and the lower housing portion does not laterally extend beyond the upper housing portion.

9. The foot switch device of claim 1, wherein the foot switch device is a wireless foot switch device.

10. A medical device system, comprising:

a medical device; and the foot switch device of claim 1, wherein:

the medical device is configured to be controlled through the foot switch device.

11. The medical device system of claim 10, wherein the medical device is an electrosurgical generator.

* * * * *